United States Patent [19]
Roberts et al.

[11] Patent Number: 6,158,104
[45] Date of Patent: Dec. 12, 2000

[54] ASSEMBLY JIG FOR USE WITH INTEGRALLY COVERED BUCKET BLADES

[75] Inventors: Dennis W. Roberts; Joseph Mark Serafini; John Clifton Williams, all of Schenectady, N.Y.

[73] Assignee: General Electric Co., Schenectady, N.Y.

[21] Appl. No.: 09/372,248

[22] Filed: Aug. 11, 1999

[51] Int. Cl.[7] .................................................. B23P 11/02
[52] U.S. Cl. ............................... 29/446; 29/464; 29/559; 29/281.1; 29/281.5; 269/43; 269/47
[58] Field of Search ............................ 29/446, 464, 466, 29/467, 559, 889.7, 281.1, 281.4, 281.5; 269/43, 47, 909

[56] References Cited

U.S. PATENT DOCUMENTS

| | | | |
|---|---|---|---|
| 3,414,958 | 12/1968 | Anderson | 269/37 |
| 4,643,645 | 2/1987 | Robbins et al. . | |
| 4,836,518 | 6/1989 | Janutta | 269/43 |
| 5,026,032 | 6/1991 | Ortlano et al. | 269/43 |
| 5,120,197 | 6/1992 | Brooks et al. . | |
| 5,191,711 | 3/1993 | Vickers et al. | 29/559 |
| 5,261,785 | 11/1993 | Williams . | |
| 5,267,834 | 12/1993 | Dinh et al. . | |
| 5,393,200 | 2/1995 | Dinh et al. . | |
| 5,445,498 | 8/1995 | Williams et al. . | |
| 5,509,784 | 4/1996 | Caruso et al. . | |
| 5,544,873 | 8/1996 | Vickers et al. | 269/47 |

*Primary Examiner*—David P. Bryant
*Assistant Examiner*—Jermie E. Cozart
*Attorney, Agent, or Firm*—Nixon & Vanderhye

[57] ABSTRACT

An assembly jig is provided for pre-twisting or rotating the closure blade prior to driving the closure blade into the notch opening at the completion of bucket assembly. In a preferred embodiment, the assembly jig is composed of three clamp assemblies, each mounted to the integral cover of the circumferentially adjacent buckets of the notch group. Each clamp assembly includes first and second axially aligned clamp brackets that are clamped the respective integral cover. The closure blade is pre-twisted or rotated by adjusting the gaps between the adjacent clamp brackets and hence the gaps between the axial ends of the closure blade cover and the axial ends of the adjacent auxiliary bucket cover(s) respectively clamped thereto. The force necessary to rotate the closure blade cover may be generated with jacking bolts that extend generally tangentially of the row of buckets, between the adjacent clamp brackets.

18 Claims, 3 Drawing Sheets

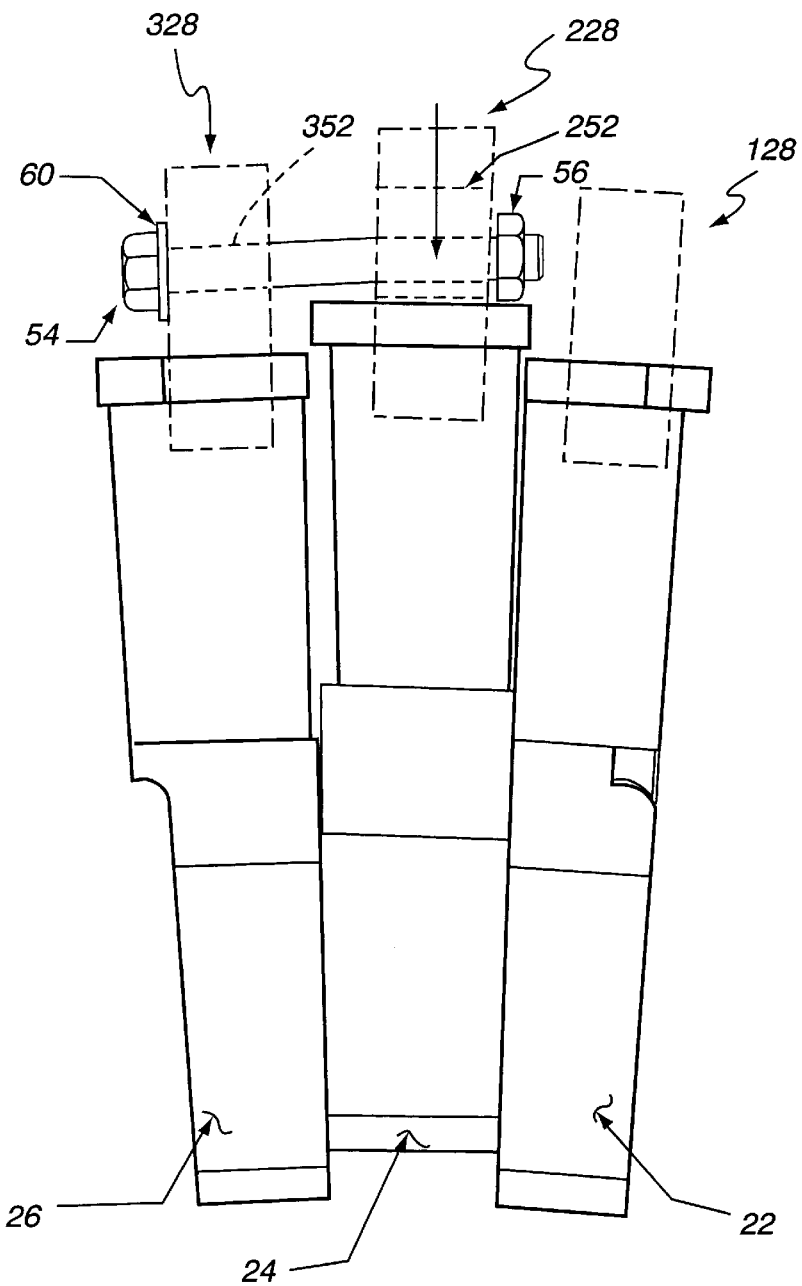
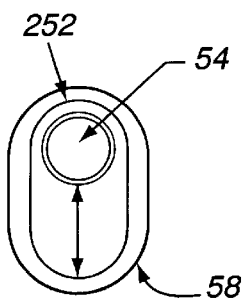

ASSEMBLY JIG FOR USE WITH INTEGRALLY COVERED BUCKET BLADES

BACKGROUND OF THE INVENTION

This invention relates to turbines and, in particular, to turbine rotor buckets having integral covers or tip shrouds.

Turbine blades, often referred to as buckets or airfoils, are subject to vibrational stresses that can impact engine efficiency and part life. To reduce these stresses, a number of ways of damping or limiting bucket or airfoil vibrations have been devised. One approach is to frictionally dampen certain modes of blade vibrations by interlocking the tips of covered or tip shrouded blades. To dampen vibratory stimuli and control natural frequencies, the integral covers or shrouds of the blades must maintain contact from bucket to bucket in a row. To create the requisite interlock from blade to blade, the blades are twisted during assembly. This pre-twist is in a circumferential direction as viewed along the long axis of the respective blade. During operation, centrifugal forces will cause radial growth and twisting of the bucket blades tending to open circumferential gaps between the blade tip covers. Thus, the covers must be assembled with enough compressive contact force between the respect adjacent buckets to provide residual force during operation despite the effects of centrifugal forces. The greater the interference required, the greater the required angle of rotation.

A turbine bucket integral shroud or cover configuration has thus been provided which introduces a pre-twist into the buckets by reason of an interference along contact surfaces between covers of adjacent buckets. The mating contact surfaces have steep locking angles which create a mechanical advantage which, in turn, converts a nominal tangential force into a significant axial force to cause the cover rotation or pre-twist. This pre-twist is necessary as discussed above to ensure that the covers stay coupled at speed and do not become free standing. Thus, the design of steep-angle integrally covered buckets relies on interference, created by rotating the covers to ensure continuous coupling.

When attempting to assemble rows of buckets with large amounts of interference of the type described above, manufacturing personnel have struggled to pre-rotate the final, closure blade into proper position for insertion into the notch opening. The original method of rotating the closure blade was to use a large C-clamp with a long segment of pipe to generate sufficient torque to rotate the blade into proper position. This process however, is too difficult and unsafe for commercial implementation.

A concept fixture 10 was then proposed, a schematic illustration of which is provided as FIG. 1. That fixture 10 consisted of a solid frame 12 that would fit over the notch group and apply pressure with jacking screws 14 in the axial direction. Because the fixture must be universal and because of difficulties encountered with the solid frame design in generating enough force to rotate the closure blade, a need remains for an assembly to facilitate rotation of the closure blade on completing a row of buckets during manufacture.

BRIEF SUMMARY OF THE INVENTION

The invention relates in general to a bucket assembly wherein each bucket has an integral cover at a radial tip of the blade portion, each cover having axially extending surfaces on either side of angled contact surfaces adapted to engage mating contact surfaces of adjacent covers such that the buckets are pre-twisted. The invention concerns in particular the installation of the final, closure blade during assembly of a row of such buckets.

More specifically, the present invention provides a fixture, referred to herein below as an assembly jig, for pre-twisting or rotating the closure blade prior to the closure blade being driven into the notch opening at the completion of the bucket assembly, that provides for ease of assembly and is safer than prior methods.

The assembly jig is composed of at least two clamp assemblies, each mounted to the integral cover of circumferentially adjacent buckets. Since the jig is adapted to pre-rotate the closure blade before it is driven to complete a row of buckets, one of the clamp assemblies is clamped to the integral cover of the closure blade and at least a second clamp assembly is clamped to either the leading auxiliary bucket cover or the trailing auxiliary bucket cover. In the presently preferred embodiment, a clamp assembly is clamped to each of the leading and trailing auxiliary bucket covers. Each clamp assembly is comprised of first and second clamp brackets that are clamped to the axial ends of the bucket cover. The closure blade is then pre-twisted or rotated by adjusting the gaps between the adjacent clamp brackets, which concurrently adjusts the gaps between the axial ends of the closure blade cover and the axial ends of the adjacent auxiliary bucket(s) respectively clamped to the clamp brackets. In the presently preferred embodiment, the necessary forces needed to rotate the closure blade cover are generated with jacking bolts that extend generally tangentially of the row of buckets, between the adjacent clamp brackets.

BRIEF DESCRIPTION OF THE DRAWINGS

These, as well as other objects and advantages of this invention, will be more completely understood and appreciated by careful study of the following more detailed description of the presently preferred exemplary embodiments of the invention taken in conjunction with the accompanying drawings, in which:

FIG. 4 is an elevational view of the closure group with the assembly jig mounted thereto, prior to driving the closure blade; and FIG. 5 is a schematic side view showing the complimentary configuration of the jig slot and jacking bolt in accordance with the invention.

DETAILED DESCRIPTION OF THE INVENTION

Figure 1:
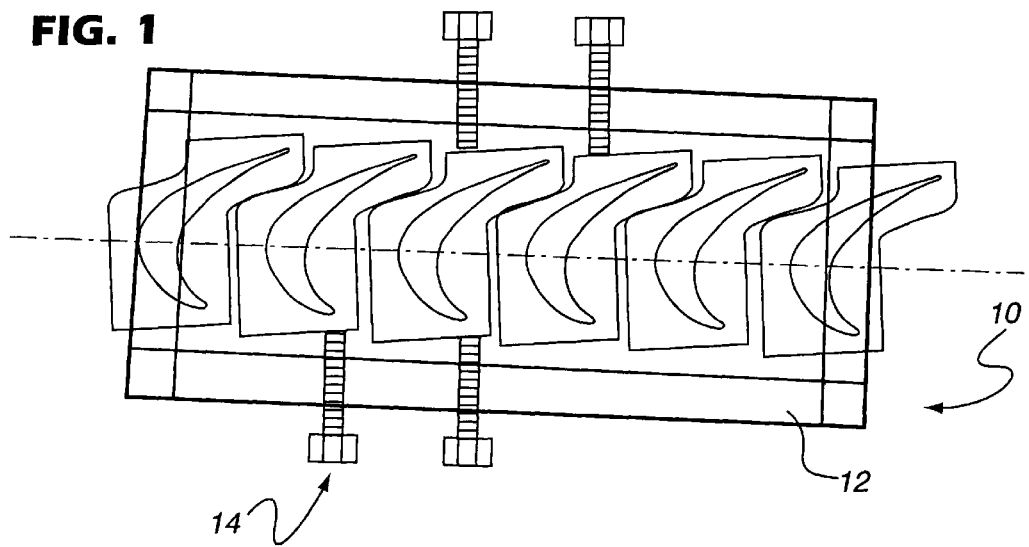
FIG. 1 illustrates a solid frame fixture for rotating a closure blade.
Figure 2:
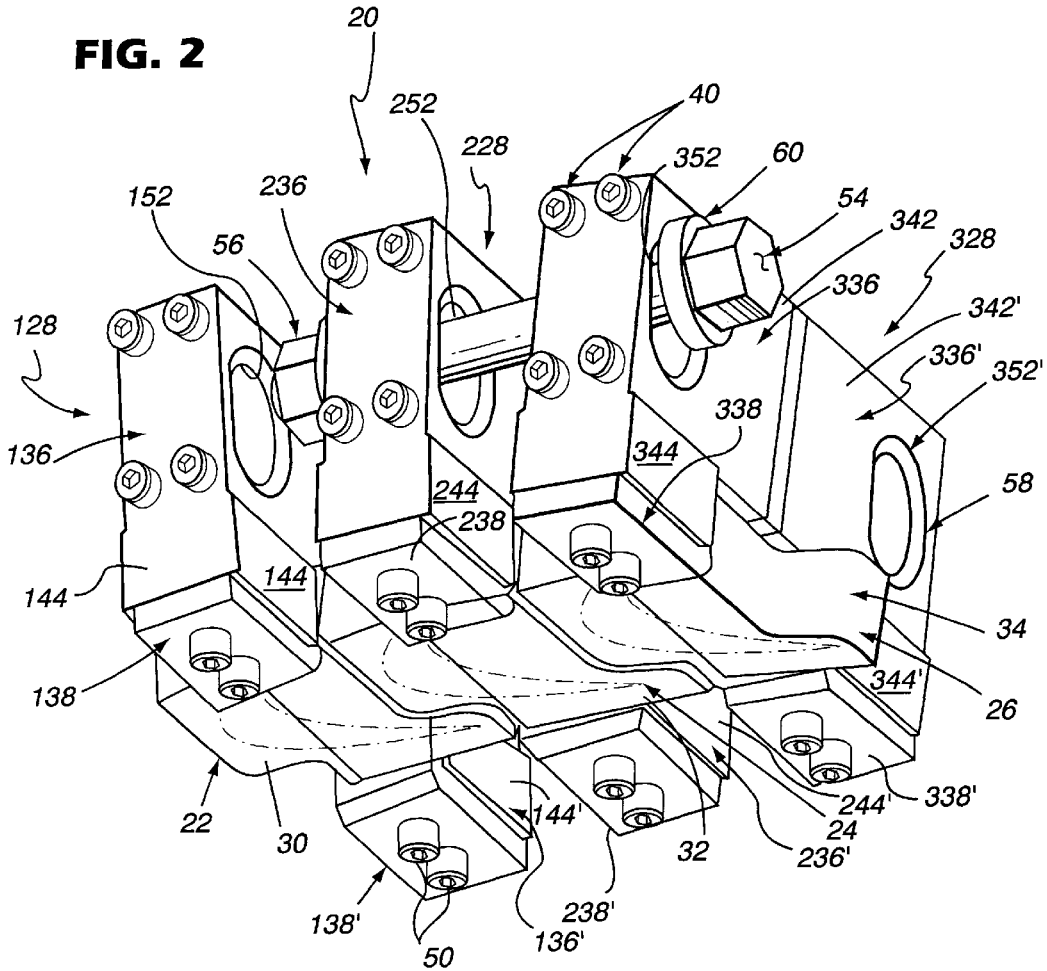
FIG. 2 is a perspective view from below of an assembly jig embodying the invention, fastened to the closure group.
Figure 3:
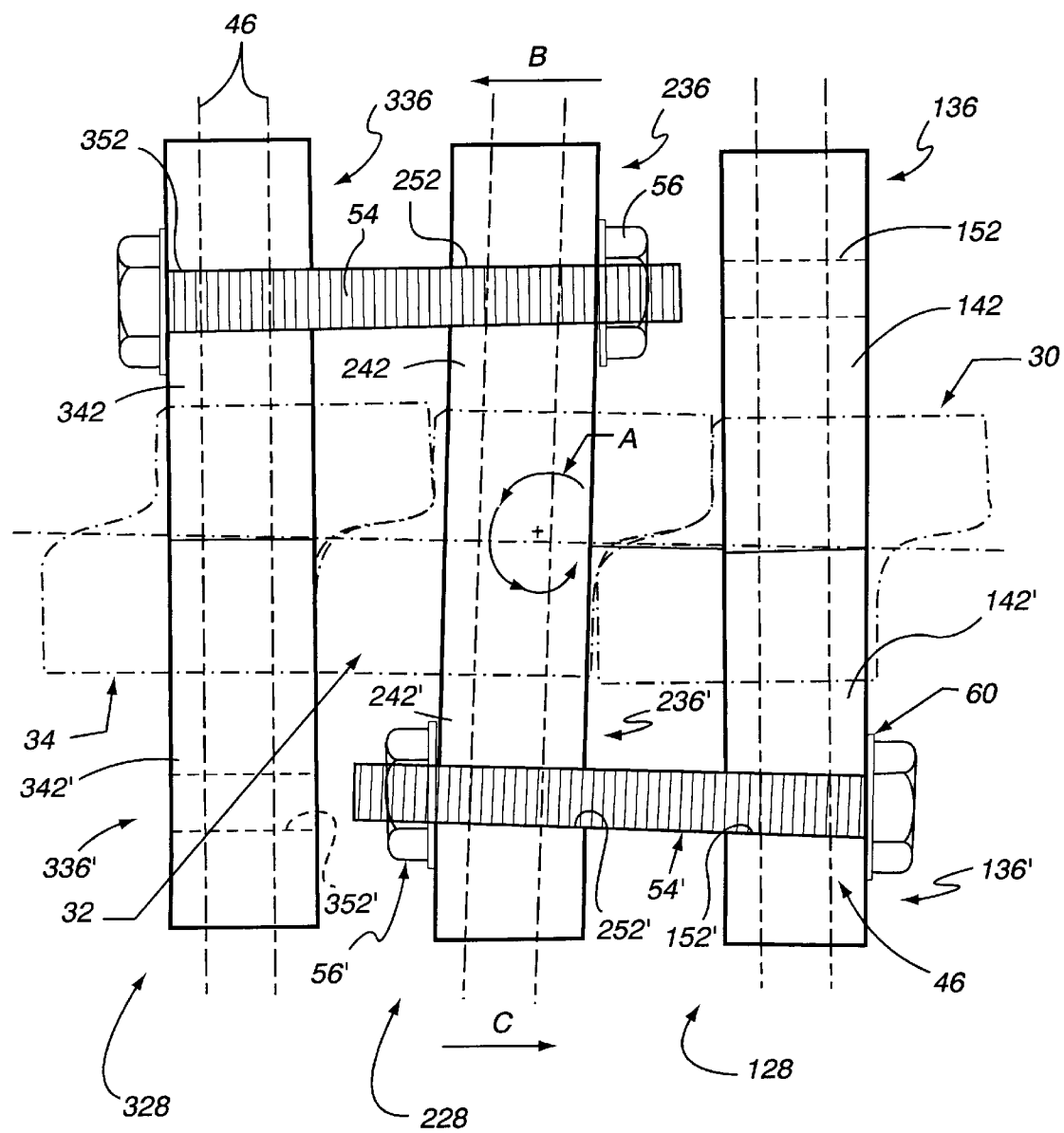
FIG. 3 is a schematic top plan view showing the assembly jig provided in accordance with a preferred embodiment of the invention and illustrating the required rotation of the closure blade prior to driving.

Referring to FIGS. 2 and 3, there is schematically shown an assembly jig 20 fastened to a closure group consisting of a leading auxiliary bucket 22, a closure blade 24, and a trailing auxiliary bucket 26. As shown therein, in accordance with the presently preferred embodiment, the assembly jig 20 is composed of three separate clamp assemblies 128, 228, 328 each fastened to the integral cover 30, 32, 34 of a respective bucket 22, 24, 26.

For convenience in the discussion hereinbelow, the clamp assembly 128 secured to the integral cover 30 of the leading auxiliary bucket 22 may be referred to as the leading clamp assembly 128, the clamp assembly 228 coupled to the integral cover 32 of the closure blade 24 may be referred to as the closure clamp assembly 228, and the clamp assembly 328 secured to the integral cover 34 of the trailing auxiliary bucket 26 may as the trailing clamp assembly 328. It is to be understood, however, that in accordance with the presently preferred embodiment, each of these clamp assemblies is substantially identical, respectively formed from substantially identical clamp brackets 136, 136'; 236, 236'; 336, 336' and fastening plates 138, 138'; 238, 238'; 338, 338', for ease of assembly and use, and to minimize manufacturing costs.

More specifically, each clamp assembly 128, 228, 328 of the assembly jig 20 includes first and second clamp brackets 136, 136'; 236, 236'; 336, 336' that are axially aligned and fastened using threaded rods such as, for example, cap screws 40. In the illustrated embodiment, each of the clamp brackets is generally L-shaped having a trunk portion 142, 142'; 242, 242'; 342, 342' for overlying at least a portion of the radially outer surface of the integral cover 30, 32, 34 of the respective bucket 22, 24, 26 and a leg portion 144,144'; 244, 244'; 344, 344' for being disposed in facing relation to the respective axial end of the bucket integral cover 30, 32, 34. The cap screws 40 extend through aligned threaded bores, schematically shown at 46, to selectively draw the clamp brackets together to clamp onto the integral cover of the respective bucket.

To ensure that the jig does not slip off the cover as force is applied, in the illustrated embodiment, fastening plates 138,138'; 238, 238'; 338, 338' are fastened to the clamp brackets with suitable cap screws 50. The locking plates overlie at least a portion of the radially inner surface of the integral cover 30, 32, 34 of the respective bucket 22, 24, 26 to radially clamp the respective clamp bracket to the integral cover.

While in the illustrated embodiment, the clamp brackets are generally L-shaped and a fastening plate is fastened to the leg of the L-shaped clamp element to capture the integral cover, it is to be understood that other clamping bracket and plate configurations could be provided without departing from the invention, provided that each clamp assembly provides for secure attachment to, particularly the axial ends of, the respective integral cover during the rotation of the closure blade. Thus, clamp assemblies comprised of more or fewer components, and of a variety of shapes can be provided. The illustrated embodiment is presently preferred because it accommodates axial and radial dimensional variations and thus can be used on a variety of bucket cover structures.

As can be seen, for example, in FIGS. 3 and 4, each of the clamp assemblies 128, 228, 328 has a width less than the width of the respective bucket cover 30, 32, 34 so that a gap remains between the clamp assemblies mounted to adjacent bucket covers. To pre-twist or rotate the closure blade, a gap adjustment assembly is provided to extend between at least one pair of circumferentially adjacent clamp brackets of each circumferentially adjacent pair of clamp assemblies. In the illustrated embodiment, the gap adjustment assembly is constructed and arranged to selectively reduce the gap between its associated clamp brackets, to rotate one of the buckets relative to the other. As an alternative (not illustrated) the gap adjustment mechanism may be constructed and arranged to selectively increase the gap between circumferentially adjacent clamp brackets to impart the desired pre-twisting or rotation to the bucket attached to one of the clamp assemblies.

Thus, in the illustrated embodiment, to impart rotation in the direction of arrow A, to pre-twist or rotate the closure blade 24 prior to the notch being driven, the gap adjustment assembly comprises jacking bolts 54, 54' that are inserted through aligned slots 152', 252' and 252, 352, as shown, and tightened to complimentary nuts 56, 56' to induce rotation of the closure blade 24. More specifically, jacking bolt 54 extends through the slot 352 in the first clamp bracket 336 of the trailing auxiliary bucket 26 and through the slot 252 of the first clamp bracket 236 of the closure blade 24, so that tightening of the jacking bolt 54 by relative rotation of the jacking bolt 54 and nut 56 induces movement of clamp bracket 236 and thus the associated axial end of closure blade 24 in the direction of arrow B. Similarly, the jacking bolt 54' is inserted through the slot 152' of the second clamp bracket 136' of the leading auxiliary bucket 22 and through the slot 252' of the second clamp bracket 236' attached to the closure blade cover 32 so that relative rotation of the jack bolt 54' and nut 56' induces movement of clamp bracket 236' and the associated axial end of closure blade 24 in the direction of arrow C. As will be appreciated, tightening the respective jacking bolts 54, 54' accomplishes the desired pre-rotation in the direction of arrow A.

While in the illustrated embodiment the required rotation is imparted by tightening jacking bolts to draw together the first clamp brackets 336 and 236 of the trailing auxiliary bucket 26 and closure blade 24, respectively, and the second clamping brackets 136' and 236' of the leading auxiliary bucket 22 and closure blade 24, respectively, it is to be understood that the desired movement of the clamp assembly 228 and associated closure blade 24 can be accomplished in the alternative by a pushing apart of the clamp brackets rather than the illustrated pulling effect of jack bolt tightening. Thus, as an alternative, the first clamp bracket 236 of the clamping assembly 228 mounted to the closure blade 24 can be urged in direction B, away from the first clamping bracket 136 of the clamping assembly 128 of the lead auxiliary bucket 22 with a suitable mechanical assembly (not shown). Similarly, the second clamping bracket 236' of the clamp assembly 228 mounted to the closure blade 24 can be urged in the direction of arrow C away from the second clamp bracket 336' of the clamp assembly 328 of the trailing auxiliary bucket 26 with a suitable mechanical assembly (not shown) so as to gradually increase a spacing between the second clamp brackets 336', 236' of the trailing bucket 26 and the closure blade 24.

Once the closure blade 24 has been sufficiently rotated, it is driven down into the notch opening and the assembly jig 20 can be removed. In that regard, each of the clamp brackets of each clamp assembly has a generally elliptically shaped slot 152,152'; 252, 252'; 352, 352' defined therethrough. The slots are generally elliptical to accommodate and allow the movement of the closure blade 24 radially downwardly into the notch opening after pre-rotation or pre-twisting. More specifically, the slots are provided to allow e.g. the closure blade 24 to move radially with respect to the jacking bolts. Thus, referring to FIG. 4, where only the jacking bolt 54 between the first clamp brackets 236, 336 of the closure blade 24 and trailing auxiliary bucket 26 is illustrated for clarity, before the closure blade is driven down radially into the notch opening, the jacking bolt 54 is disposed in the vertically upper portion of the respective slot 352 of the bracket 336 of the trailing clamp assembly 328 and in the lower portion of the slot 252 of the bracket 236 of the closure clamp assembly 228. After the closure blade is driven, however, the jacking bolt 54 will be accommodated as shown, e.g. in FIG. 5 in the upper portion of the slot 252 of the closure clamp assembly 228. As illustrated in particular in FIGS. 2 and 5, the elliptical slots 152, 152'; 252, 252'; 352, 352' are chamfered as at 58 to accommodate washers 60. Washers 60 are preferably spherical washers to provide better seating as the jacking bolts are tightened.

Although the invention is described hereinabove with reference in particular to an assembly jig having three clamp assemblies, so as to properly position the closure blade with respect to both the leading and trailing auxiliary buckets, as mentioned herein above, it may be possible to limit the assembly jig to first and second clamp assemblies wherein the desired rotation of the closure blade is accomplished by drawing two of the adjacent clamp brackets toward one another while displacing the other two adjacent clamp brackets away from one another so as to rotate the closure blade relative to the auxiliary bucket.

Thus, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An assembly jig for pre-rotating an integrally covered closure bucket to be driven between a pair of pre-rotated integrally covered auxiliary buckets, comprising:
    at least first and second clamp assemblies, each said clamp assembly comprising first and second clamp brackets for being respectively clamped to each axial end of a respective integral bucket cover, said first and second clamp assemblies being disposed so that the first clamp brackets thereof are generally adjacent and the second clamp brackets thereof are generally adjacent; and
    a gap adjustment mechanism extending between said at least first and second clamp assemblies for selectively adjusting at least one of a gap between said generally adjacent first clamp brackets and a gap between said generally adjacent second clamp brackets.

2. An assembly jig as in claim 1, wherein each said clamp bracket includes a trunk portion for overlying at least a portion of a radially outer surface of a respective bucket cover and a leg portion for overlying at least a portion of an axial end face of the bucket cover.

3. An assembly jig as in claim 1, wherein the first and second clamp brackets of each said clamp assembly are axially aligned and coupled so as to be selectively axially drawn together to selectively clampingly engage a respective bucket cover therebetween.

4. An assembly jig as in claim 1, wherein each said clamp assembly further comprises a clamp plate operatively coupled to each said clamp bracket and overlying at least a portion of a radially inner surface of a respective bucket cover, to clamp the respective axial end of the bucket cover therebetween.

5. An assembly jig as in claim 1, wherein said gap adjustment mechanism includes slots defined through said adjacent first clamp brackets and at least one threaded rod extending through said slots and between said first clamp brackets.

6. An assembly jig as in claim 1, wherein said gap adjustment mechanism selectively reduces a gap between said adjacent first clamp brackets.

7. An assembly jig as in claim 1, comprising three said clamp assemblies, with a first gap adjustment mechanism extending between a first two adjacent of said clamp assemblies and a second gap adjustment mechanism extending between a second two adjacent of said clamp assemblies, said first gap adjustment mechanism selectively adjusting a gap between generally adjacent second clamp brackets of said first two of said clamp assemblies, said second gap adjustment mechanism selectively adjusting a gap between generally adjacent first clamp brackets of said second two of said clamp assemblies.

8. An assembly jig as in claim 7, wherein said first and second gap adjustment mechanisms each selectively reduces a gap between respective adjacent clamp brackets.

9. An assembly jig as in claim 8, wherein each said gap adjustment mechanism includes aligned slots defined through said respective adjacent clamp brackets, at least one bolt extending through said aligned slots and between said clamp brackets, and a nut threaded to said bolt for drawing said respective adjacent clamp brackets toward each other.

10. A method for pre-rotating an integrally covered closure bucket to be driven between a pair of pre-rotated integrally covered auxiliary buckets, comprising:
    providing an assembly jig including: at least first and second clamp assemblies, each said clamp assembly comprising first and second clamp brackets for being respectively clamped to each axial end of a respective integral bucket cover;
    clamping said first and second clamp brackets of said first clamp assembly to one of said integrally covered auxiliary buckets;
    clamping said first and second clamp brackets of said second clamp assembly to said integrally covered closure bucket;
    disposing a gap adjustment mechanism to extend between said second clamp brackets of said first and second clamp assemblies; and
    actuating said gap adjustment mechanism so as to adjust a gap between said second clamp brackets, thereby to rotate said integrally covered closure bucket relative to said one of said integrally covered auxiliary buckets.

11. A method as in claim 10, wherein the first and second clamp brackets of each said clamp assembly are axially aligned and coupled so as to be selectively axially drawn together, and wherein each said clamping step comprises axially clampingly engaging a respective bucket cover between said first and second clamp brackets of said respective clamp assembly.

12. A method as in claim 11, wherein each said clamp bracket includes a trunk portion for overlying at least a portion of a radially outer surface of the respective bucket cover and a leg portion for overlying at least a portion of an axial end face of the bucket cover, and wherein each said clamping step comprises axially clamping the respective bucket cover between leg portions of said first and second clamp brackets.

13. A method as in claim 10, wherein each said clamp assembly further comprises a fastening plate operatively coupled to each said clamp bracket and overlying at least a portion of a radially inner surface of a respective bucket cover, to radially clamp the respective axial end of the bucket cover between said clamping bracket and said clamping plate.

14. A method as in claim 10, wherein a slot is defined through said adjacent second clamp brackets and said gap adjustment mechanism includes a threaded rod extending through said slots and between said second clamp brackets.

15. A method as in claim 10, wherein said adjusting step comprises reducing a gap between said adjacent second clamp brackets.

16. A method as in claim 10, wherein a third clamp assembly is provided and further comprising clamping first and second clamp brackets of said third clamp assembly to the other of said integrally covered auxiliary buckets; and further wherein a first gap adjustment mechanism is provided to extend between said first and second clamp assemblies and a second gap adjustment mechanism is provided to extend between said second and third clamp assemblies, said first gap adjustment mechanism selectively adjusting a gap between generally adjacent second clamp brackets of said first and second clamp assemblies, and said second gap adjustment mechanism selectively adjusting a gap between generally adjacent first clamp brackets of said second and third clamp assemblies.

17. A method as in claim 16, wherein said first and second gap adjustment mechanisms each selectively reduces a gap between respective adjacent clamp brackets.

18. An assembly jig as in claim 17, wherein each said gap adjustment mechanism includes aligned slots defined through said respective adjacent clamp brackets, at least one bolt extending through said aligned slots and between said clamp brackets, and a nut threaded to said bolt for drawing said respective adjacent clamp brackets toward each other.

* * * * *